United States Patent

Ariga et al.

[11] Patent Number: 6,045,849
[45] Date of Patent: Apr. 4, 2000

[54] PROTEIN FOOD

[75] Inventors: Toshiaki Ariga; Emiko Yamazaki; Kaeko Yamashita; Masaoki Sasaki; Nobuyuki Yamaji, all of Chiba Pref.; Naokata Ishii, Tokyo, all of Japan

[73] Assignee: Kikkoman Corporation, Chiba Pref., Japan

[21] Appl. No.: 09/110,198

[22] Filed: Jul. 6, 1998

[30] Foreign Application Priority Data

Jul. 15, 1997 [JP] Japan .................................. 9-203902
Mar. 10, 1998 [JP] Japan ................................ 10-075070

[51] Int. Cl.$^7$ ...................................................... A23L 1/22
[52] U.S. Cl. ......................... 426/534; 426/536; 426/538; 426/656

[58] Field of Search .................................. 426/534, 533, 426/536, 538, 540, 656, 650

[56] References Cited

U.S. PATENT DOCUMENTS

| | | | |
|---|---|---|---|
| 4,505,938 | 3/1985 | Togawa et al. | 426/46 |
| 4,797,421 | 1/1989 | Ariga et al. | 514/844 |
| 5,773,262 | 6/1998 | Ariga et al. | 435/118 |
| 5,780,060 | 7/1998 | Levy et al. | 424/489 |
| 5,814,494 | 9/1998 | Ariga et al. | 435/118 |

*Primary Examiner*—Leslie Wong
*Attorney, Agent, or Firm*—Young & Thompson

[57] ABSTRACT

A proanthocyanidin, such as an extract of grape seeds or skin, is added to a protein food, so that the flavor of the protein food is improved.

3 Claims, 1 Drawing Sheet

PROTEIN FOOD

BACKGROUND OF THE INVENTION

1. Field of the Invention

The present invention relates to a protein food, particularly isolated soybean protein food and concentrated soybean protein food, to which a proanthocyanidin, such as an extract from seeds or skin of grapes, has been added.

2. Description of Related Art

As a representative example of protein foods, there is a nutrient subsidiary food called protein, which forms a market for athletes, females, elderly people, and the like, and the commercial form thereof varies. The raw materials therefor mainly are vegetable protein represented by soybean protein and animal protein, such as albumen and whey.

It is considered conventionally that such protein is used for increasing muscular strength of sportsmen and for diet for females, but recently it is purchased by elderly people and the like, thereby diversifying the user, and as a result it is varied with respect to the flavor and the form, that is, for example, it is flavored with vanilla or cocoa and is in a powder form, a liquid form, a paste form, or a solid form.

Such protein has no problem with respect to nutritive value, but is still required to be improved in flavor and richness in taste. Particularly, in the case wherein the raw material is isolated soybean protein or concentrated soybean protein, the protein is apt to fall short of richness in taste and mild after-taste.

Further, it is known that proanthocyanidins have various physiological activities, such as active-oxygen elimination activity and anticholesterol activity.

SUMMARY OF THE INVENTION

The inventors of the present invention have investigated intensively to improve the flavor of protein foods as described above and surprisingly have found that proanthocyanidins that themselves taste astringent have a remarkable effect in improving the flavor of protein, leading to the completion of the invention.

That is, the present invention is directed to a protein food characterized by containing a proanthocyanidin.

The protein food of the present invention is improved in flavor (including richness in taste and mild after-taste) and it is recognized that the protein food has an antifatigue effect, so that the protein food of the present invention is high in value as a nutrient subsidiary food.

DETAILED DESCRIPTION OF THE INVENTION

Figure 1:
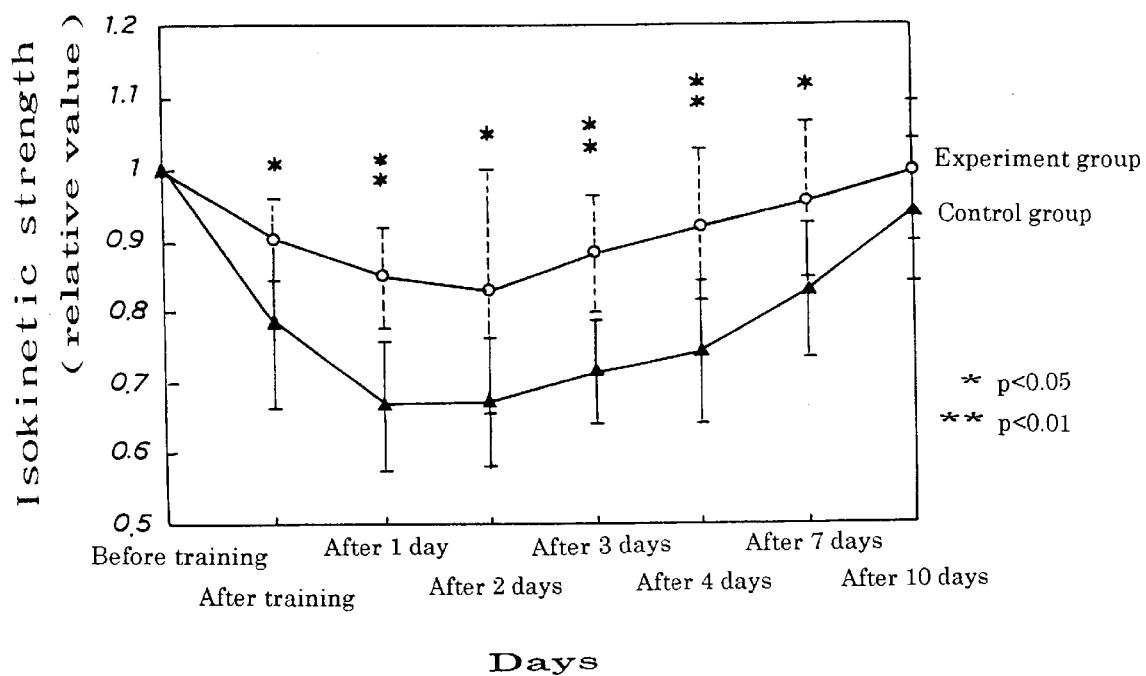
FIG. 1 is a graph showing the change in the voluntary maxmial isokinetic strength of the elbow flexor with time after a session of eccentric muscular exercise, measured in the below Experiment Example 4 in terms of relative value (mean ± standard deviation) to the strength before the exercise.

The protein food falling in the present invention is one in any form, such as a powder form, a liquid form, a solid form, and a paste form, whose raw material is isolated soybean protein, concentrated soybean protein, whey, albumen, and the like and is preferably powder protein whose major raw material is in particular isolated soybean protein or concentrated soybean protein.

In the present invention, a proanthocyanidin is added to such protein food so that the protein food may contain the proanthocyanidin. Proanthocyanidins are condensed tannins present in various plant parts, that is, a group of compounds consisting of flavan-3-ol or flavan-3,4-diol as constitutional units that is condensed or polymerized. When these are processed with an acid, anthocyanidins, such as cyanidin, delphinidin, and pelargonidin, are produced, which leads to the name "proanthocyanidins." Proanthocyanidins include procyanidines, prodelphinidins, and propelargonidins, and their stereoisomers, such as dimers, trimers, tetramers, and decamers or higher polymers consisting of the above constitutional units and can be obtained by extracting from various plant parts, such as seeds of grapes, skins of grapes, cranberry fruits, apple fruits, red beans, and bark of cryptomerias, sun trees, and pine trees.

Products whose major component is proanthocyanidins are on the market, such as "GRAVINOL" (trade name; manufactured by Kikkoman Corporation) and "KPA" (trade name; manufactured by Kikkoman Corporation) whose raw material is grape seeds, "Applephenon" (trade name; manufactured by The Nikka Whisky Distilling Co., Ltd.) whose raw material is unripe apple fruits, and "Pycnogenol" (trade name; manufactured by Horphag Research Ltd. in the Swiss Confederation) whose raw material is bark of maritime pine trees and these products on the market can be used.

The proanthocyanidin is preferably an extract obtained by extracting seeds or skin of grapes with water or an organic solvent followed by concentration.

The method for adding a proanthocyanidin to a protein food is not particularly restricted and the proanthocyanidin can be added in any stage of producing the protein food.

The amount of the proanthocyanidin to be added is preferably 0.1 (w/w) % or more and more preferably 0.2 to 0.8 (w/w) % in the protein food in terms of total flavanol. This amount of the proanthocyanidin is measured by Vanillin-HCl method (J. Sci. Food Agric., 29, 788, 1978).

Hereinbelow, Examples and Experiment Examples exhibiting the effects of the present protein food are shown.

EXAMPLE 1

A part was taken out of 950 g of a powder of isolated soybean protein ("New Fujipro 1200" manufactured by Fuji Oil Co., Ltd.) to which 1.2% of calcium carbonate was added, 5 g of a proanthocyanidin ("GRAVINOL" manufactured by Kikkoman Corporation), 40 g of sucrose, and small amounts of vitamins A, B1, B2, B6, B12, C, and E were added to the part, they were mixed, and then the mixture was added to the rest of the powder followed by mixing to obtain a protein containing 0.2% of the proanthocyanidin.

EXAMPLE 2

A part was taken out of 930 g of a powder of isolated soybean protein ("Fujipro C1" manufactured by Fuji Oil Co., Ltd.) to which 1% of calcium carbonate was added, 26.6 g of a proanthocyanidin ("KPA 15" manufactured by Kikkoman Corporation) was added to the part, they were mixed, and then the mixture was mixed with the rest of the powder. While the resulting mixture was sprayed with 300 ml of an aqueous solution containing 30 g of glucose and small amounts of dextrine and vitamins A, B1, B2, B6, B12, C, and E, the mixture was granulated and dried to obtain a protein containing 0.4% of the proanthocyanidin.

EXAMPLE 3

A part was taken out of 955 g of a powder of concentrated soybean protein ("Fujipro SA" manufactured by Fuji Oil Co., Ltd.) to which 1% of calcium carbonate was added, 39.9 g of a proanthocyanidin ("KPA 15" manufactured by Kikkoman Corporation) and small amounts of vitamins A, B1, B2, B6, B12, C, and E were mixed with the part, and the resulting mixture was added to the rest of the powder followed by mixing to obtain a protein containing 0.6% of the proanthocyanidin.

EXPERIMENT EXAMPLE 1

While commercially available isolated soybean protein powder ("New Fujipro 1200" manufactured by Fuji Oil Co., Ltd.) was sprayed with an aqueous solution containing glucose and vitamins dissolved therein, the powder was granulated to obtain a granular protein.

A proanthocyanidin ("KPA 15" manufactured by Kikkoman Corporation) was added in an amount of 0.1 to 1.6 (w/w) % in terms of total flavanol to the obtained protein to prepare proanthocyanidin-containing proteins (Samples 1 to 5).

10 g of each of these Samples was added to every 200 ml of commercially available milk, 25 panelists tasted each of thus prepared milks to compare the flavors with that of the control (protein free from the proanthocyanidin was used).

The results are shown in Table 1. The sensory test was carried out on the basis of the following seven ratings:

-3: much worse than the control
-2: worse than the control
-1: a little worse than the control
0: no difference from the control
1: a little better than the control
2: better than the control
3: much better than the control

TABLE 1

| Sample | Added amount of proanthocyanidin (%) | Average rating | Significant test (P: significance probability) |
|---|---|---|---|
| 1 | 0.1 | 0.16 | not present |
| 2 | 0.2 | 0.80 | present; P < 0.001 |
| 3 | 0.4 | 1.06 | present; P < 0.001 |
| 4 | 0.8 | 0.64 | present; P < 0.05 |
| 5 | 1.6 | 0.21 | not present |

EXPERIMENT EXAMPLE 2

Small amounts of milk flavor and vanilla essence were added to the granular protein prepared in the same way as in Experiment Example 1 to prepare a vanilla-flavored protein, and a proanthocyanidin ("GRAVINOL" manufactured by Kikkoman Corporation) was added in an amount of 0.1 to 1.6 (w/w) % in terms of total flavanol thereto to prepare proanthocyanidin-containing proteins (Samples 6 to 10).

These Samples were subjected to the sensory test in the same way as in Experiment Example 1. The results are shown in Table 2.

TABLE 2

| Sample | Added amount of proanthocyanidin (%) | Average rating | Significant test (P: significance probability) |
|---|---|---|---|
| 6 | 0.1 | 0.15 | not present |
| 7 | 0.2 | 0.61 | present; P < 0.05 |
| 8 | 0.4 | 0.68 | present; P < 0.05 |

TABLE 2-continued

| Sample | Added amount of proanthocyanidin (%) | Average rating | Significant test (P: significance probability) |
|---|---|---|---|
| 9 | 0.8 | 0.60 | present; P < 0.05 |
| 10 | 1.6 | 0.25 | not present |

EXPERIMENT EXAMPLE 3

While a commercially available isolated soybean protein powder ("Fujipro CL" manufactured by Fuji Oil Co., Ltd.) was sprayed with an aqueous solution containing glucose and vitamins dissolved therein, the powder was granulated to obtain a granular protein.

To the resulting protein were added a proanthocyanidin ("KPA 15" manufactured by Kikkoman Corporation) in an amount of 0.2 or 0.4 (w/w) % in terms of total flavanol or catechins ("Polyphenon 60" manufactured by Mitsui Norin Co.) in an amount of 0.2 or 0.4 (w/w) % with the content of catechins being assumed to be 100% to prepare flavanol-containing proteins (Samples 11 to 14).

These Samples were subjected to the sensory test in the same way as in Experiment Example 1. The results are shown in Table 3.

TABLE 3

| Sample | Added amount of proantho-cyanidin (%) | Added amount of catechins (%) | Average rating | Significant test (P: significance probability) |
|---|---|---|---|---|
| 11 | 0.2 | — | 0.80 | present (P <0.001) |
| 12 | — | 0.2 | 0.38 | not present |
| 13 | 0.4 | — | 1.06 | present (P <0.001) |
| 14 | — | 0.4 | 0.23 | not present |

As is apparent from the results shown in Tables 1 to 3, the flavor of proteins was improved by the addition of proanthocyanidins and in particular the addition of proanthocyanidins in an amount of 0.2 to 0.8% in terms of total flavanol improved the flavor significantly in comparison with the case wherein proanthocyanidins were not added. On the other hand, such an effect was not observed when catechins were used.

EXPERIMENT EXAMPLE 4

<Method>

While a commercially available isolated soybean protein powder ("New Fujipro 1200" manufactured by Fuji Oil Co., Ltd.) was sprayed with an aqueous solution containing glucose and vitamins dissolved therein, the powder was granulated to prepare a granular protein.

To 100 g of the protein was added a proanthocyanidin ("KPA 15" manufactured by Kikkoman Corporation) in an amount of 400 mg in terms of total flavanol to prepare a proanthocyanidin-containing protein.

20 healthy adult males and females (24 to 28 years old) as subjects were divided into an experiment group (n=10) and a control group (n=10). Starting one day before the experiment, the experiment group was given the proanthocyanidin-containing protein to be taken in and the control group was given the proanthocyanidin-free protein (placebo) to be taken in. The intake was 15 g each time, which was dissolved in water, and the solution was given three times (morning, noon, and evening) a day.

Only on the day of the start of the experiment (the day on which training stimulation was given), one out of three administrations was performed one hour before the training stimulation. During the experiment, the meals were checked and sports activities that would use the subject muscles and activities that would positively reduce or increase fatigue were prohibited.

<Apparatus and Experimental Isokinetic Dynamometer Procedure>

For both applications of eccentric exercise stimulus and measurements of strengths, an isokinetic dynamometer (DTM-9000; Sakai Iryou Kiki Co.) was used.

For elbow flexors and extensors of the nondominant arm of each subject, two sets of the eccentric contraction (rate: 10 deg/s) were carried out 8 times under the maximum effort (training stimulation). Immediately before and immediately after the training stimulation and after one day to 10 days of the training stimulation, the voluntary maximum strength of each of isometric (elbow joint angle: 90 degrees), a concentric shortening (rate: 10 deg/s), and the eccentric contraction (rate: 10 deg/s) was measured.

For each of isometric, concentric and eccentric contractions, the force relative to the maximum strengths before the training stimulation was determined and the level of the lowered forth was used as an indicator of the muscle fatigue.

<Results and Discussion>

The results are shown in FIG. 1. As is apparent from the results shown in FIG. 1, from immediately after the training stimulation to after 10 days, the shortening maximum concentric force reached the minimum (mean, 67 to 83%) after 1 to 2 days and restored gradually thereafter. In the experiment group, the force showed significantly higher values than that in the control group at the time of the lowest peak and almost throughout the restoration process. Approximately the same tendency was observed with respect to the isometric strength and the eccentric strength.

From the above results, it has become apparent that the intake of the proanthocyanidin-containing protein has an effect in suppressing the lowering in muscular strength caused by an intense eccentric exercise and in accelerating the restoration process.

What is claimed is:

1. A protein food comprising:
    a flavor improver that is a proanthocyanidin, wherein the added amount of said proanthocyanidin is 0.2 to 0.8 (w/w) % of total flavanol; and
    one of an isolated soybean protein food, a concentrated soybean protein food, whey, and albumen.

2. The protein food as claimed in claim 1, wherein said proanthocyanidin is an extract of grape seeds or skin.

3. The protein food as claimed in claim 1, wherein said protein food is isolated soybean protein food or concentrated soybean protein food.

* * * * *